Oct. 26, 1943.　　　　E. MARTIN　　　　2,332,925
HYDRAULIC CONTROL FOR GOVERNORS
Filed May 25, 1940　　　2 Sheets-Sheet 1
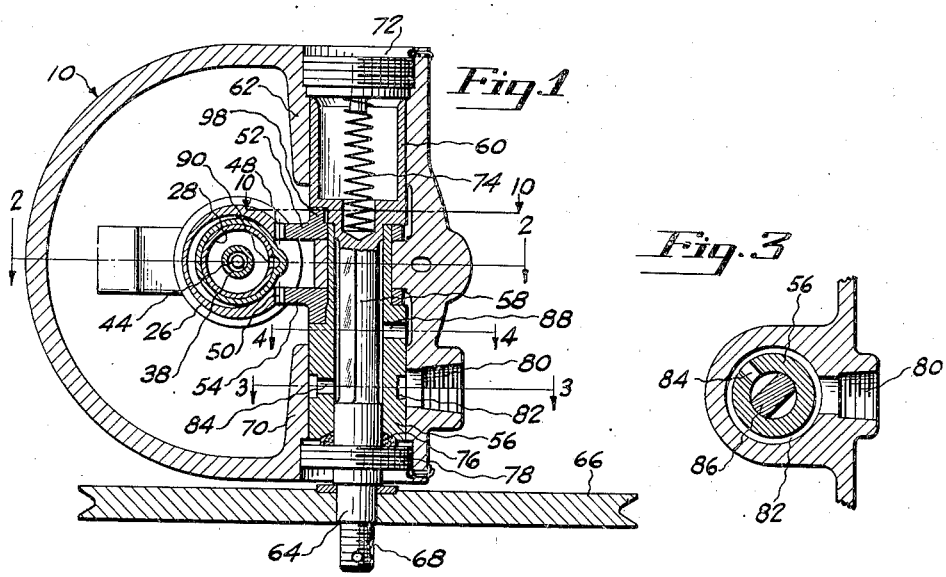
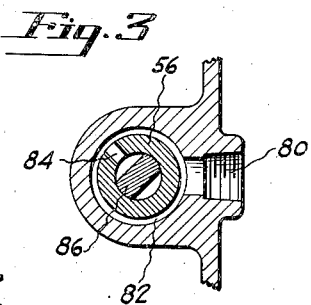
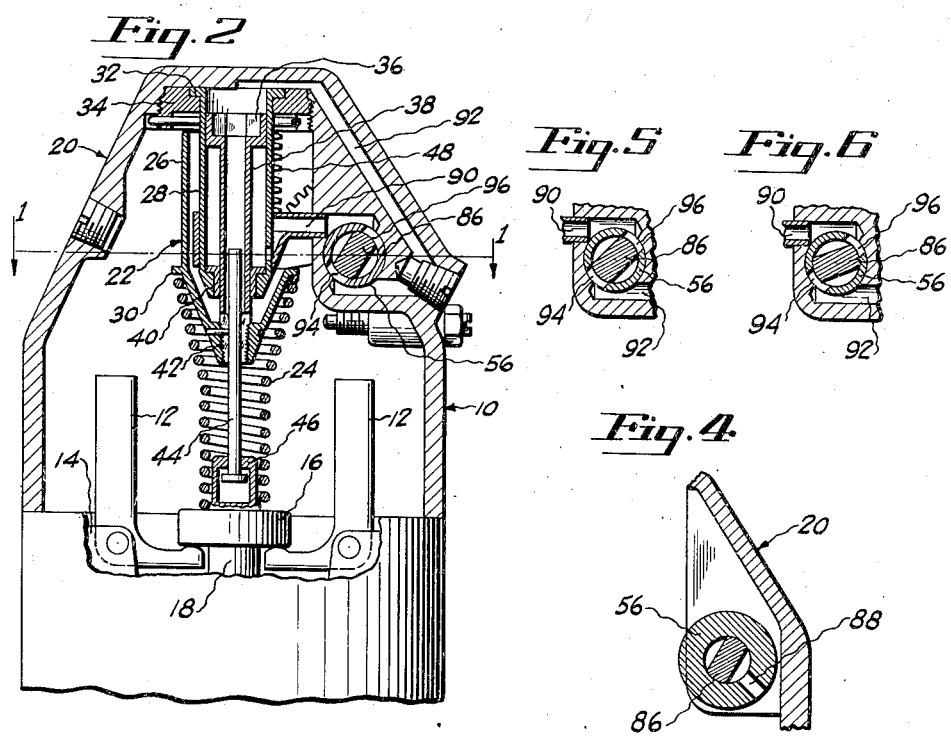
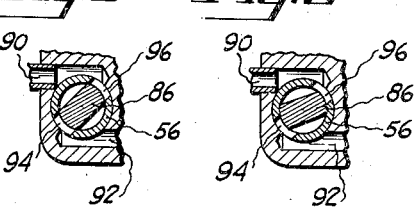
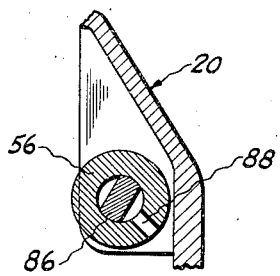
INVENTOR
*Erle Martin*
BY *Harris G. Luther*
ATTORNEY

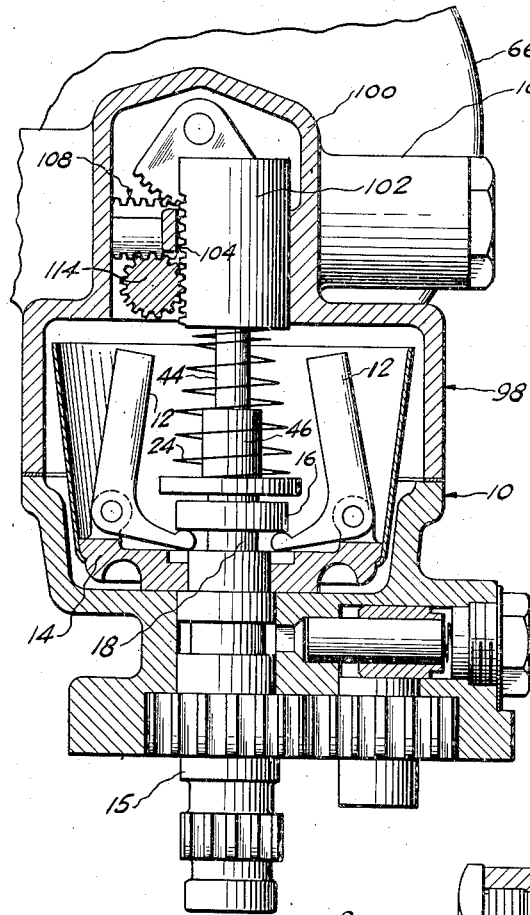
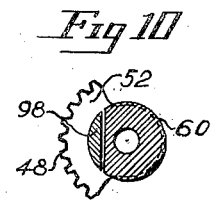
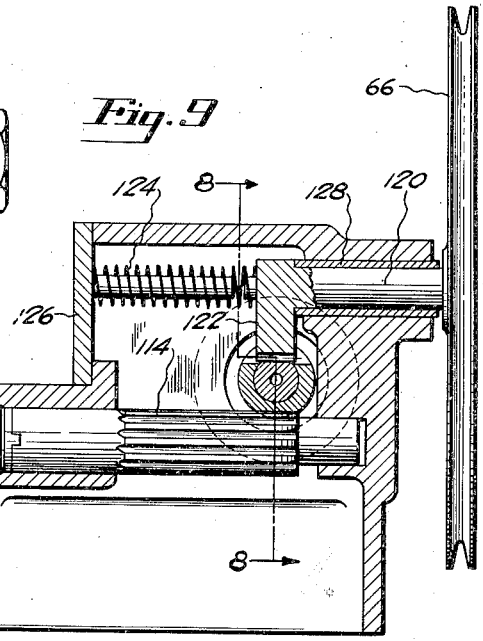
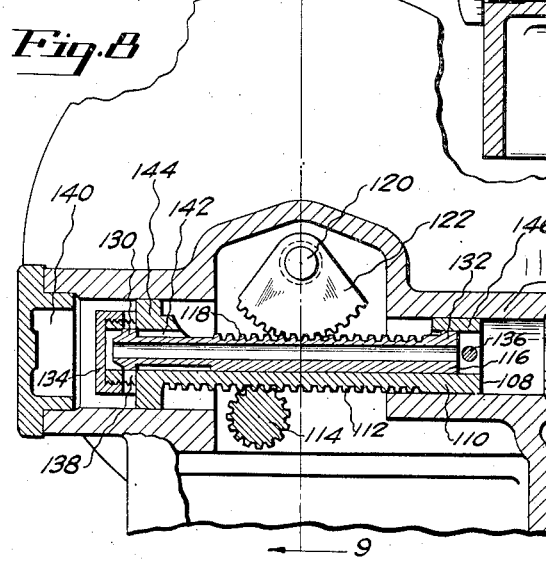

Patented Oct. 26, 1943

2,332,925

UNITED STATES PATENT OFFICE 2,332,925

HYDRAULIC CONTROL FOR GOVERNORS

Erle Martin, West Hartford, Conn., assignor to United Aircraft Corporation, East Hartford, Conn., a corporation of Delaware Application May 25, 1940, Serial No. 337,240

6 Claims. (Cl. 264—3)

This invention relates to improvements in hydraulic regulating or adjusting means and has particular reference to hydraulic means for regulating or adjusting a device such as a speed governor.

An object of the invention resides in the provision of an improved regulating device which may be manually set and which will move another mechanism such as the speed setting mechanism of a speed governor to the position for which the adjusting means is manually set and maintain the governor adjusting means in that position until the adjusting means is manually changed.

A further object resides in the provision of a hydraulic adjusting device which requires a very slight manual effort to bring it to a desired setting and which relies upon the force exerted by hydraulic fluid under pressure to perform its adjusting operation.

A still further object resides in the provision of an improved regulating device of the character indicated which may be entirely manually operated in case the supply of pressure fluid should fail.

Other objects and advantages will be more particularly pointed out hereinafter or will become apparent as the description proceeds.

In the accompanying drawings in which like reference numerals are used to designate similar parts throughout, there are illustrated two suitable mechanical arrangements for the purpose of disclosing the invention. The drawings, however, are for the purpose of illustration only and are not to be taken as limiting the invention since it will be apparent to those skilled in the art that various changes may be made in the illustrated arrangements without in any way exceeding the scope of the invention.

In the accompanying drawings, Fig. 1 is a transverse sectional view taken on the line 1—1 of Fig. 2 through a speed governor, and governor regulating device, constructed according to the invention, applied thereto.

Fig. 2 is a longitudinal sectional view on the line 2—2 of Fig. 1.

Fig. 3 is a sectional view of a fragmentary portion of the mechanism shown in Fig. 1 taken on the line 3—3 of Fig. 1.

Fig. 4 is a sectional view similar to Fig. 3 taken on the line 4—4 of Fig. 1.

Fig. 5 is a fragmentary sectional view of the adjusting mechanism on the same sectional plane as Fig. 2 showing a different operative position of the parts of the regulating mechanism from that shown in Fig. 2.

Fig. 6 is a view similar to Fig. 5 showing a still different operative position of the parts of the regulating mechanism.

Fig. 7 is a longitudinal sectional view of a governor showing a somewhat modified form of hydraulic regulating device applied thereto.

Fig. 8 is a sectional view similar to Fig. 7 taken on a plane parallel to the plane on which Fig. 7 is taken, this plane being indicated by line 8—8 of Fig. 9.

Fig. 9 is a transverse sectional view of the modified form of regulating device taken on the line 9—9 of Fig. 8.

Fig. 10 is a sectional view taken on the plane of line 10—10 of Fig. 1.

Referring to the drawings in detail and particularly to Figs. 1 to 6, inclusive, the numeral 10 generally indicates a governor casing within which are disposed a pair of flyballs 12 pivotally mounted on a rotatable member 14 carried by a drive shaft 15 and bearing against the underside of a thrust bearing 16 carried by a plunger 18 which may be integral with or operatively connected to a control member such as a valve, not illustrated. The above described parts are clearly shown in Figs. 1 and 7. The casing 10 is provided with a cap, generally indicated at 20. An adjustable abutment, generally indicated at 22, and a compression spring 24 are disposed between the top of the cap and the upper side of the thrust bearing 16 in such a manner that the expansive force of the spring acts on the thrust bearing to oppose the force exerted on the thrust bearing by the action of centrifugal force on the flyballs 12 as they are rotated within the governor casing.

The speed setting of the governor may be varied by changing the loading on the speeder spring 24 so that it will require a greater or a lesser force to be exerted by the flyballs 12 to move the bearing 16 and plunger 18 thereby varying the rotational speed of the flyballs necessary to bring the bearing and shaft to a particular or neutral position. The loading on the speeder spring may be varied by moving the upper abutment 22 in a direction to increase or in a direction to decrease the compression of the spring. The present invention relates particularly to improved means for moving this upper abutment in the directions aforesaid.

The upper abutment comprises two concentric cylindrical members 26 and 28 in which the outer cylindrical member has an eccentric bore, is movable and has an annular shoulder 30 providing a seat for the upper end of the speeder spring 24, and the inner cylinder is relatively stationary and is fixed to the cap 20 by suitable means such as the end flange 32 and nut 34 secured in a screw threaded recess in the closed end of the cap. A piston 36 is reciprocable in the inner cylinder 28 and is connected with a hollow shaft 38 which extends through a suitable fluid seal 40 in the lower end of the inner cylinder 28 to a rigid connection 42 with the lower end of the outer cylinder 26. If desired, a shaft 44 may be extended from the lower end of the outer cylinder 26 to a lost motion connection 46 with the upper end of the shaft 18 in order that the abutment may be utilized to positively move the plunger 18 to and hold it in a limiting position against the action of the flyballs 12 and the spring 24.

The outer cylinder 26 has two parallel rows of rack teeth 48 and 50 along one side thereof which mesh, respectively, with the teeth of two gear sectors 52 and 54 mounted on a rotatable hollow shaft 56 which extends transversely part way through the governor casing 10. Within the hollow shaft 56 there is an inner shaft 58 provided at one end with an enlarged hollow cylindrical portion 60 which cooperates with a boss 62 formed in the casing to provide an end bearing for the inner shaft and provided at its opposite end with a non-circular portion 64 upon which is mounted a manually operable member, such as the pulley 66, and with a threaded portion 68 for receiving a nut to retain the pulley in position on the shaft. At the pulley end the inner shaft 58 is rotatably supported in the outer shaft which has a bearing in a boss 70 formed in the casing 10. The outer end of the boss 62 is closed by suitable means such as the plug 72 and a compression spring 74 within the cylindrical shaft portion 60 bears at one end against this plug and at its opposite end against the closed end of the cylindrical portion. The force of this spring 74 is transmitted by the annular external shoulder surrounding the inner shaft at the beginning of the enlarged portion to the outer shaft 56. This causes the shaft 56 to bear at its opposite end against a packing 76 which is retained in the boss 70 by a suitable apertured plug 78 which provides an oil seal at the location where the inner shaft 58 projects from the casing to receive the pulley 66.

A connection 80 for hydraulic fluid under pressure, such as engine lubricating oil, is provided in the outer side of the boss 70 and leads to an annular channel 82 in the portion of the outer shaft 56 within the boss. This annular channel is connected with the interior of the outer shaft by a radial port 84. Within the outer shaft 56 the inner shaft 58 has its opposite side portions cut away to constitute this portion of the inner shaft a valve body of substantially rectangular cross section as indicated at 86 in Figs. 2 to 6, inclusive. Inwardly of the port 84 the inner shaft 56 is provided with a drain port 88, diametrically opposed to the port 84, which drain port opens to the interior of the governor casing from which the fluid may be drained by suitable channels leading to the interior of the engine which supplies the pressure fluid or to some suitable fluid reservoir. A fluid channel 90 leads from one side of the outer cylinder 56 to the lower end of the inner cylinder 28 and a second channel 92 leads from the opposite side of the outer shaft 56 to the upper end of the inner cylinder, as is particularly illustrated in Fig. 2. The channels 90 and 92 are located in a plane spaced along the entire length of the outer shaft from the planes of the fluid inlet connection 80 and drain port 88, and in the plane of the channels 90 and 92 the outer shaft is provided with a pair of diametrically opposed valve slots or ports 94 and 96 of a length approximately equal to the thickness of the inner shaft valve body 86 as is particularly illustrated in Figs. 2, 5 and 6. Both of the gear sectors 52 and 54 have a rigid connection with the outer shaft 56 and in addition the gear sector 52 has a lost motion connection 98 with the inner shaft 58 so that the inner shaft may have a slight movement relative to the outer shaft 56 which will enable the valve body 86 to uncover the valve slots 94 and 96 in opposite directions but will cause the outer shaft and the abutment to follow the movements of the inner shaft.

The space between one side of the valve body 86 and the interior of the hollow outer shaft 56 will always be connected with the pressure fluid through the port 84 as is particularly shown in Fig. 3 and the space between the opposite side of the valve body and the interior of the outer shaft 56 will always be connected with drain through the port 88, as is particularly shown in Fig. 4.

When the inner shaft 58 is in the position relative to the outer shaft 56 as is indicated by the position of the valve body 86 in Fig. 2 the pressure fluid will flow through the slot 94 to the channel 92 and to the space within the inner cylinder 28 above the piston 36 thereby forcing the piston and outer cylinder 26 downwardly to compress the spring 24. At the same time the space within the inner cylinder below the piston will be connected with drain through the channel 90, the slot 96 and the port 88. As the outer cylinder 26 moves downwardly it will rotate the gear sectors 52 and 54 and the outer shaft 56 until the slots 94 and 96 are brought opposite the ends of the valve body 86, as shown in Fig. 5, when both the pressure fluid supply and the drain will be cut off and the piston will be held in a position in the inner cylinder determined by the angular position of the valve body 86 of shaft 58. In the event there should be a leakage of fluid from the upper end of the cylinder 28 permitting the piston 36 to rise, the outer shaft 56 would be rotated relative to the inner shaft back towards the relation illustrated in Fig. 2 thereby reconnecting the upper end of the cylinder with the pressure fluid supply and admitting sufficient fluid to the cylinder to make up the leakage and return the piston to its original position. The device is thus operated to maintain the spring loading constant at the value determined by the position of the pulley 66.

When it is desired to change the loading on the spring 24, a slight manual force in the desired direction will be applied to the pulley to move the inner shaft relative to the outer shaft within the freedom of the lost motion connection including a lug 98. The lug 98 is formed on the upper surface of the segmental gear 52 as shown in Figs. 1 and 10 and this gear is driven or otherwise secured in position on the upper end of the sleeve valve member 56. The lug 98 fits loosely within a recess milled in the lower end face of the hollow cylindrical portion 60 of the inner valve member 58. As a result of this lug and recess connection the shaft 58 may be rotated slightly without moving the sleeve valve member 56. This slight rotation effected manually by the pilot is sufficient to control admission and exhaust of fluid to and from the cylinder 28 and thus control loading of the speeder spring 24. Should the hydraulic system fail for any reason continued manual rotation of the shaft 58 will rotate the sleeve 56 and through the segmental gears 52 and 54 and rack teeth 48 on member 22 will manually effect movement of the member 22. If it is desired to increase the loading the inner shaft would be moved to the position relative to the outer shaft as shown in Fig. 2 whereas, if it is desired to decrease the loading on the spring 24 the inner shaft would be moved to the position relative to the outer shaft as illustrated in Fig. 6, in which case the lower end of the cylinder 28 would be connected with the pressure fluid supply through the channel 90 and the upper end of the cylinder would be connected with drain through the channel 92 thus causing the piston 36 to rise in the cylinder. As the piston 36 moves in the cylinder 28 and by moving the outer cylinder 22 rotates the gears 52 and 54, the outer shaft 56 will be rotated with the inner shaft 58 as long as rotation of the inner shaft is maintained. As soon as rotation of the inner shaft is discontinued the outer shaft will come to the stop position, illustrated in Fig. 5, and will maintain the piston in the corresponding position until the inner shaft is again rotated to change the spring loading. The entire rotational movement of the outer shaft 56 is kept to less than one complete revolution to avoid a reversal of the cylinder connections with the spaces between the inner and outer shafts.

In the form of the invention shown in Figs. 7, 8 and 9 the governor structure may be substantially the same as that described above except that the cap, generally indicated at 98, is somewhat modified. The cap 98 is formed with a hollow extension 100 above the spring 24 within which extension there is slidably mounted a movable upper spring abutment 102 provided along one side thereof with rack teeth 104. A transverse cylinder 106 is formed integrally along one side of the extension 100, or rigidly secured thereto, and contains a compound slidable member generally indicated at 108. This member 108 comprises an outer slidable tubular member 110 having rack teeth 112 along the lower face thereof which rack teeth mesh with teeth on an elongated gear element 114 rotatably mounted in the cap 98, the teeth of which also mesh with the rack teeth 104, of the abutment 102 so that lengthwise movements of the member 110 in the cylinder 106 will move the abutment 102 up and down by rotating the gear element 114. Within the element 112 there is an inner slidable tubular element 116 having rack teeth 118 along the upper face thereof which rack teeth lie in a longitudinal slot provided in the upper portion of the outer member 112. The pulley 66 is mounted on a shaft 120 which projects into the extension 100 and carries a gear sector 122 the teeth of which mesh with the rack teeth 118 on the member 116. A compression spring 124 may be inserted between the wall 126 and the inner end of the shaft 120 to urge the adjacent face of the sector 122 into contact with the end of a bearing bushing 128 surrounding the shaft 120 to provide a fluid seal for the shaft 120. The inner member 116 is provided at each end with a piston portion, as indicated at 130 and 132, which closely fit the bore of the outer member 110. Movement of the inner member lengthwise relative to the outer member is limited by an end closure member 134 secured to one end of the outer member and by a pin 136, or other suitable means, extending through the opposite end of the outer member, the distance between the closure member and the pin being somewhat greater than the length of the inner member. The closure member 134 is provided with one or more ports, as indicated at 138, which cooperate with the piston portion 130 of the member 116 in such a manner that when the member 116 is in one position relative to the outer member 110 the chamber 140 in the end of the cylinder 106 will be connected with drain through the channels 142 and the end of the member 116 will be closed by the closure member 134. When the member 116 is in the opposite position relative to the member 110 the interior of the member 116 will be connected through the ports 138 with the chamber 140. The outer member 110 is provided with a piston 144 reciprocable in the end of the cylinder containing the chamber 140 and with a piston 146 reciprocable in the opposite end of the cylinder and a pressure fluid supply line 148 is connected into this opposite end of the cylinder.

When it is desired to change the loading on the spring 24 the pulley 66 will be rotated in one direction or the other, imparting a corresponding movement to the member 116 relative to the member 112. Assuming that the pulley is given a clockwise rotational movement, as viewed in Fig. 8, the member 116 will be moved to the left relative to the member 110 and will connect the chamber 140 with drain through the port 138 and close off the left hand end of the member 116. Fluid pressure from the line 148 will then act against the piston 146 to move the member 110 to the left and rotate the gear element 114 which will impart a corresponding movement to the abutment 102. If movement of the pulley be discontinued movement of the member 110 under the actuation of the fluid pressure will continue until the port 138 is closed by the piston 130 at which time both the inlet and outlet to the chamber 140 will be blocked and the fluid trapped in this chamber will prevent further movement of the member 110. If leakage from this chamber should occur permitting the piston 144 to move, the outer member 110 would move relative to the inner member 116 until the ports 138 were uncovered in a direction to admit pressure fluid to the chamber 140. As the piston 144 is much larger than the piston 146 this admission of pressure fluid would return the outer member to its original position in which the port 138 would again be closed off.

If the pulley 66 were rotated in a counter-clockwise direction, as viewed in Fig. 8, the inner member 116 would be moved to the right relative to the outer member 110 thereby connecting the chamber 140 with the pressure fluid supply through the interior of the member 116 and the port 138 which would result in a movement of the outer member 110 to the right since the area of the piston 144 is greater than the area of the piston 146 as mentioned above. When rotation of the pulley is discontinued the outer member will continue to move to the right a small amount until the port 138 is closed by the piston 130, and will be retained in that position by the fluid trapped in the chamber 140, leakage of fluid from this chamber being made up in the manner described above.

From the above description it is apparent that there has been provided an improved manually controllable fluid actuated adjusting mechanism which operates with a negligible manual force and is automatically locked in any position to which it is brought by the manual control.

While two slightly different mechanical constructions have been hereinabove described and illustrated in the accompanying drawings for the purpose of disclosing the invention, it is to be understood that the invention is not limited to the particular construction so described and illustrated but that various changes in the size, shape and arrangement of parts may be resorted to as come within the scope of the sub-joined claims.

Having now described the invention so that others skilled in the art may clearly understand the same, what it is desired to secure by Letters Patent is as follows:

1. Means for adjusting the loading on the speed regulating spring of a centrifugal governor comprising, a movable abutment for one end of said spring, a relatively fixed cylinder, a piston reciprocable in said cylinder and operatively connected to said abutment, a hollow valve member rotatable by said piston, a common fixed support for said cylinder and said valve member, and rigid conduits connecting said valve member with said cylinder, a pressure fluid conduit supported by said fixed support, said conduit and a drain operatively connected with said rotatable valve member, a second valve member within said hollow valve member having a limited freedom of movement relative thereto, and manually actuatable means for rotating said second valve member relative to said hollow valve member to control the application of hydraulic fluid under pressure to said cylinder and to rotate both of said valve members together to manually move said abutment upon failure of supply of hydraulic fluid under pressure.

2. Means for adjusting the loading on a regulating spring comprising, a movable abutment for one end of said spring provided with rack teeth along one side thereof, a piston and cylinder device for moving said abutment, a pressure fluid connection, a drain connection, a hollow valve member between said connections and said device having valve ports and teeth operatively associated with said rack teeth to render said valve member movable with said abutment, an inner valve member carried by said hollow valve member having a limited freedom of movement relative thereto to control said valve ports to reverse the connection of said pressure fluid and drain connection with the opposite ends of said piston and cylinder device, and manual means for moving said inner valve member relative to said hollow valve member.

3. Speed setting means for a governor having a speeder spring comprising, a movable abutment for one end of said spring having rack teeth along one side thereof, a rotatable hollow shaft mounted adjacent to said abutment and having valve ports therein, a gear element connecting said shaft with the rack teeth on said abutment, a piston and cylinder device for moving said abutment, channels connecting the ends of said cylinder with ports in said shaft, a pressure fluid line connected with a port in said shaft, a drain connection through a port in said shaft, a valve body within said shaft having a limited freedom of rotational movement relative to said shaft for reversing the application of said pressure fluid and said drain connection to the opposite ends of said cylinder, and manual means for moving said valve body relative to said shaft.

4. Speed setting means for a governor having a speeder spring comprising, a movable abutment for one end of said spring having rack teeth along one side thereof, a rotatable hollow shaft mounted adjacent to said abutment and having valve ports therein, a gear element connecting said shaft with the rack teeth on said abutment, a piston and cylinder device for moving said abutment, channels connecting the ends of said cylinder with ports in said shaft, a pressure fluid line connected with a port in said shaft, a drain connection through a port in said shaft, a valve body within said shaft having a limited freedom of rotational movement relative to said shaft for reversing the application of said pressure fluid and said drain connection to the opposite ends of said cylinder, and manual means for moving said valve body relative to said shaft and for moving said shaft and said abutment in the event of a failure of the supply of said pressure fluid.

5. Speed setting means for a governor having a speeder spring comprising, a movable abutment for one end of said spring having rack teeth along one side thereof, a rotatable hollow shaft mounted adjacent to said abutment and having valve ports therein, a gear element connecting said shaft with the rack teeth on said abutment, a relatively fixed cylinder within said movable abutment, a piston reciprocable in said cylinder and rigidly connected to said abutment, channels connecting the ends of said cylinder with ports in said shaft, a pressure fluid line connected with a port in said shaft, a drain connection through a port in said shaft, a valve body within said shaft having a limited freedom of rotational movement relative to said shaft for reversing the application of said pressure fluid and said drain connection to the opposite ends of said cylinder, and manual means for moving said valve body relative to sai shaft.

6. Speed setting means for a governor having a speeder spring comprising, a movable abutment for one end of said spring having rack teeth along one side thereof, a rotatable hollow shaft mounted adjacent to said abutment and having valve ports therein, a gear element connecting said shaft with the rack teeth on said abutment, a piston and cylinder device for moving said abutment, channels connecting the ends of said cylinder with ports in said shaft, a pressure fluid line connected with a port in said shaft, a drain connection through a port in said shaft, a valve body within said shaft having a limited freedom of rotational movement relative to said shaft for reversing the application of said pressure fluid and said drain connection to the opposite ends of said cylinder, and manual means for moving said valve body relative to said shaft.

ERLE MARTIN.